Nov. 17, 1959  J. B. FREED  2,913,219
LINED VALVE
Filed Jan. 16, 1958  2 Sheets-Sheet 2

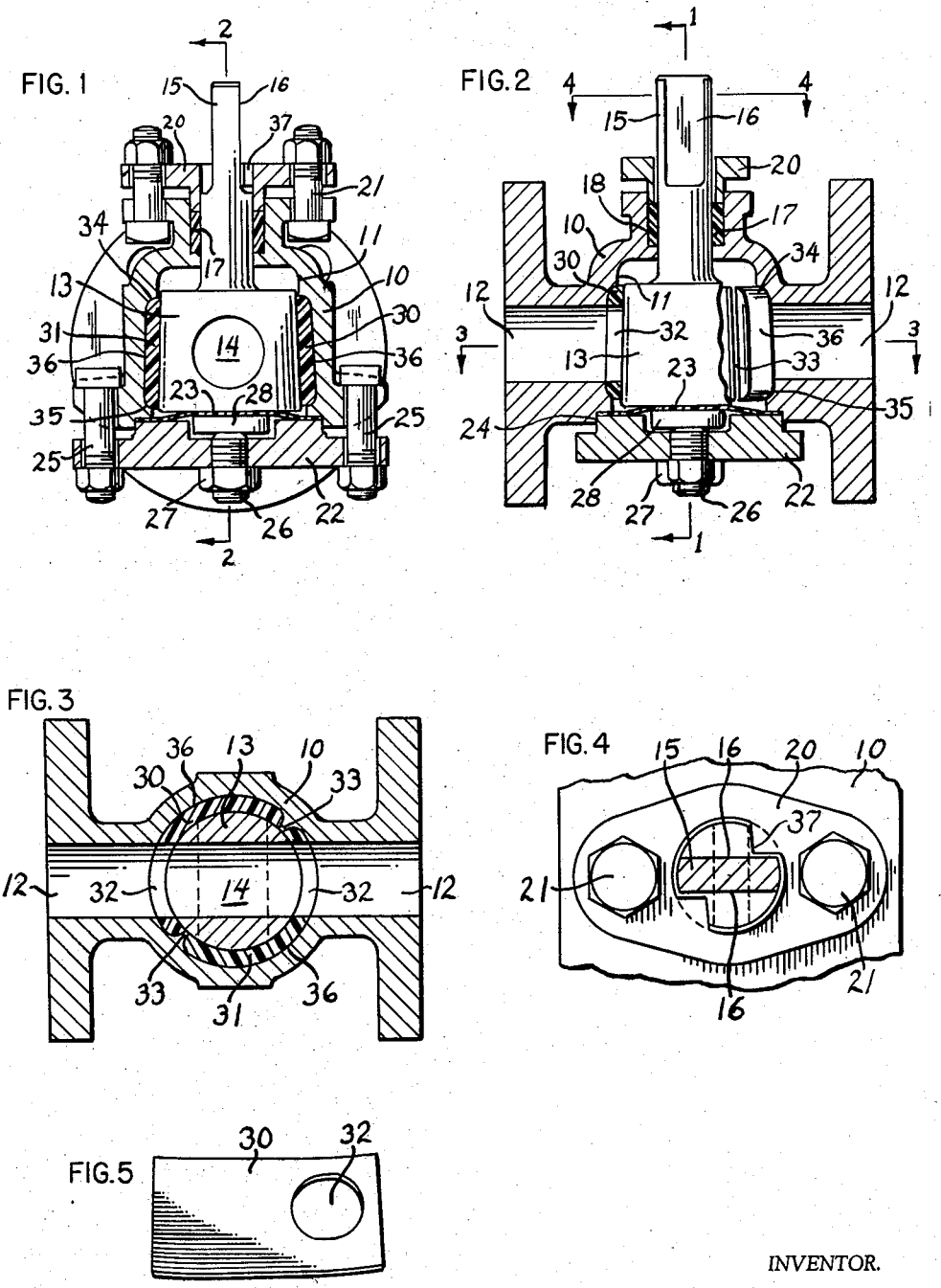

INVENTOR.
JACOB B. FREED
BY
Marechal, Biebel, French & Bugg
ATTORNEYS

United States Patent Office 2,913,219
Patented Nov. 17, 1959

2,913,219

LINED VALVE

Jacob B. Freed, Dayton, Ohio, assignor to The Duriron Company, Inc., Dayton, Ohio, a corporation of New York Application January 16, 1958, Serial No. 709,373

3 Claims. (Cl. 251—288)

This invention relates to plug valves, and more particularly to lined plug valves of the type capable of use in handling corrosive fluids.

The invention is described in detail hereinafter in connection with lined plug valves employing liners formed of a polyethylene material such particularly as one of the polytetrafluoroethylene materials sold under the trade name Teflon which have been found especially suitable for such use as pointed out, for example, in the patents of Robert C. Schenck, Nos. 2,713,987 and 2,729,420 and Jacob B. Freed No. 2,735,645, all issued to the assignee of this application. These Teflon materials have definite practical advantages for use in valve liners from the standpoint of their inert nature, resilience and anti-frictional properties, and also they are readily deformable by cold flow under pressure into close pressure sealing engagement with the relatively movable valve parts. At the same time, however, these materials are also subject to permanent deformation, particularly under conditions of wide temperature variations, which establishes controlling requirements of relative proportions for maximum sealing efficiency, as is pointed out in detail in the patent to Deas Sinkler No. 2,776,104 also issued to the assignee of this application.

The above noted patents all show lined plug valves incorporating liners of Teflon material which are tubular and therefore completely surround their associated plugs. Valves of this construction have proved highly successful for many uses, but their cost has been relatively high, due at least in part to several factors involved in the production and installation of the liner. Thus the liner material itself is not inexpensive, yet only a relatively small portion of an entire tubular liner takes part directly in the sealing action, namely the portions closely surrounding the respective ports in the plug and body. Furthermore, the liner must be formed and sintered as an individual unit before it is assembled in the valve, and its proportions must be relatively closely controlled. Additionally it is desirable with such a liner to machine both of the opposed surfaces of the plug and the bore in the body, which adds to the cost of production of both of these parts.

The Teflon materials discussed above are emphasized in connection with the present invention because irrespective of the difficulties attending their use in valve liners and the related cost factors, the plug valves which employ such liners have proved so satisfactory that such valves have already been widely accepted and used in industry. These materials are therefore considered for the purpose of this disclosure as typifying certain definite problems in the production of lined valves, so that a valve construction which overcomes some or all of these difficulties while retaining the many practical features and advantages of liners of Teflon material would be especially desirable and would also be applicable to other liner materials as well.

It is accordingly a primary object of this invention to provide a lined plug valve which is capable of employing a liner of Teflon material, which offers all the advantages of preformed tubular liners while eliminating the difficulties encountered in the use of such liners as outlined above, and particularly which requires materially less torque for operation without reduction in sealing effectiveness.

It is therefore another object of the invention to provide a lined plug valve incorporating a liner which is constructed of sheet material, which does not require preforming to accurate size and shape, which requires substantially less material than a preformed tubular liner for the same size valve, and which is subject to substantial tolerances in its overall dimensions.

A further object of the invention is to provide a lined valve as outlined above wherein the liner is formed of a plurality of separate pieces of sheet material which are separately assembled within the bore in the valve body and are held in sealing position by the plug.

An additional object of the invention is to provide a lined plug valve wherein the liner material is held in the body while being free to flow or extrude under pressure in all directions along the plug, namely circumferentially of the plug as well as in both directions axially of the plug.

It is also an object of the invention to provide a lined plug valve wherein the bore in the valve body does not require machining, and wherein in fact preferred results in the assembly and operation of the valve are obtained if the bore is left in the naturally rough state of a casting.

Further objects and advantages of the invention will be apparent from the following description, the accompanying drawings and the appended claims.

In the drawings:

Fig. 1 is a sectional view through a lined plug valve constructed in accordance with the invention, the view being taken on the line 1—1 of Fig. 2;

Fig. 2 is a section on the line 2—2 of Fig. 1 with the plug partially broken away and with one section of the liner removed;

Fig. 3 is a section on the line 3—3 of Fig. 2;

Fig. 4 is a fragmentary view taken as indicated by the line 4—4 of Fig. 2;

Fig. 5 is a detail view of one of the liner sections for the valve of Figs. 1–3;

Figure 6:
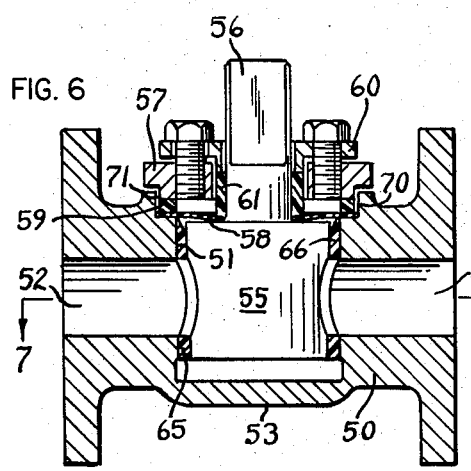
Fig. 6 is a view similar to Fig. 1 showing another valve constructed in accordance with the invention and taken on the line 6—6 of Fig. 7.

Referring to the drawings, which illustrate preferred embodiments of the invention, the valve body 10 in Figs. 1–3 is provided with a generally tapered transverse bore 11 having a pair of opposed ports 12 therein and adapted to receive the tapered valve plug 13 which is provided with a through port or flow passage 14. The plug 13 includes a stem 15 which projects from the smaller end thereof outwardly of the body and is provided with flats 16 on its outer end for interlocking engagement with an operating handle. The stem is shown as sealed with respect to the body by a gasket or gland 17 which is received in a counterbore 18 in the adjacent end of the body and is held in sealing engagement with the stem 15 by a gland follower 20 secured as by bolts 21 to the body.

The other end of the body 10 is closed by a cap 22 in cooperation with a diaphragm 23 set in a counterbore 24 in the end of the body, and bolts 25 secure the cap 22 in place as shown. The cap 22 also carries an adjusting screw 26 having a lock nut 27 on the outside of the cap and engaging a thrust disk 28 on the inside of the cap which has direct pressure engagement through the diaphragm 23 with the larger end of the plug 13 to force the plug inwardly of the body.

The liner in the valve of Figs. 1–3 is formed in two separate sections 30 and 31, each of which is of the construction shown in detail in Fig. 5. These liner sections are separately formed from a suitable sheet material such as one of the Teflon materials already discussed, and each is proportioned lengthwise to extend slightly less than 180° around the bore 11 and plug 13. Each of the liner sections 30 and 31 is provided with a port 32 therethrough located adjacent one end thereof as shown to match one of the ports 12 in the bore 11, and these ports 32 may be preformed or may be drilled in the liner sections after the latter have been assembled in the body. Additionally, since the bore 11 is shown as tapered in the same direction as the plug 13, the liner sections 30 and 31 have their upper and lower edges correspondingly curved as shown in Fig. 5 for appropriate fit in the bore 11.

It is desirable to index the respective liner sections 30 and 31 in the positions shown in Fig. 3 so that each extends from a position adjacent one side of one of the ports 12 across that port to a position adjacent the corresponding side of the other port 12 while leaving a clearance circumferentially of the bore between the adjacent ends of the two liner sections. This result is accomplished as shown in Figs. 2 and 3 by providing the bore 11 with a pair of axially extending ribs 33 which project radially inwardly of the surrounding area of the bore adjacent one side only of each of the ports 12 in substantially diametrically opposed relation, and the liner sections 30 and 31 are proportioned individually to line the surface areas of the bore 11 which lie between these ribs 33 as shown in Fig. 3. In addition, the bore is shown as having circumferentially extending shoulders 34 and 35 at opposed ends of the ribs 33 which cooperate therewith to form pockets 36 in the wall of the bore, and the axial dimension of the liner sections 30 and 31 matches the spacing between these shoulders sufficiently to permit the liner sections to be received therebetween as shown.

With this construction as shown in Figs. 1–3, assembly of the valve requires initially simply that the liner sections 30 and 31 be fitted individually into the pockets 36 followed by insertion of the plug 13 to a sufficient extent to hold the liner sections in place. Each of the liner sections is initially of sufficiently greater thickness than the radial dimensions of the ribs 33 to project radially inwardly beyond the ribs for proper sealing engagement with the plug, and satisfactory results from this standpoint have been obtained with the liner sections initially approximately ¼ inch in thickness as compared with a radial dimension of 3/16 inch for the ribs 33. The plug 13 may then be forced under pressure into the body to the extent required to align its port 14 with the ports 12, after which the other parts are assembled to hold the plug permanently in place, and the screw 26 provides for whatever subsequent adjustment may be required to maintain the plug in sealing relation with the liner.

This valve construction offers a variety of practical advantages in addition to the fact that the formation of the individual liner sections from sheet material is very much simpler and less expensive than the production of tubular liners of Teflon material. For example, since the two liner sections can be inserted in the bore separately and also can be flexed to whatever extent is necessary for insertion, the bore 11 does not require the machining which would be necessary for the reception of a close-fitting tubular liner. In fact, preferred results are obtained if the surfaces of the pockets 36 are left in the rough state which they normally have as a casting, because such rough surfaces cooperate with the outer surfaces of the liner sections to hold them in place against the axial component of the forces developed by the pressure insertion of the plug 13.

An especially important feature and advantage of the valve construction of the invention is that it makes it possible for the material of the liner sections to flow or extrude in all directions along the surface of the plug 13 as the plug is forced into the proper sealing relation therewith. Thus not only can the radially inner portions of the liner sections flow or extrude axially of the plug in both directions, but they can also flow circumferentially of the plug in the spaces between the adjacent ends of the liner sections overlying the ribs 33. The result is that the sealing effectiveness of the valve is maintained high, but the torque required to turn the plug is markedly reduced as compared with a valve of the same size incorporating a tubular liner, for example a torque of 6 foot pounds for a 1-inch valve of the present invention as compared with 22 foot pounds for the same size valve incorporating a tubular liner arranged as shown in the above Freed patent, and a torque of 60 foot pounds for a 4-inch valve of the invention as compared with 130 foot pounds for a valve of the same size constructed as shown in the Freed patent.

It will be apparent that the desired maximum sealing efficiency is obtained only so long as the liner sections are maintained in sealing engagement with the areas on the surface of the plug which surround each end of the plug port 14, and that if the plug port were permitted to cross the ribs 33, leakage might occur. Accordingly, provision is made for assuring that the plug can turn only in the range wherein its port does not cross either end of either of the liner sections, i.e. a range extending 90° in clockwise direction as viewed in Fig. 3. Referring to Fig. 4, the gland follower 20 is constructed to include a shoulder or lug 37 in the upper end of the bore therethrough which is adapted to engage the flats 16 on the plug stem 15 to stop counterclockwise rotation of the plug in the position shown in Fig. 3, and similarly to limit rotation of the plug in clockwise direction to 90° from the position shown in Fig. 3.

Figure 7:
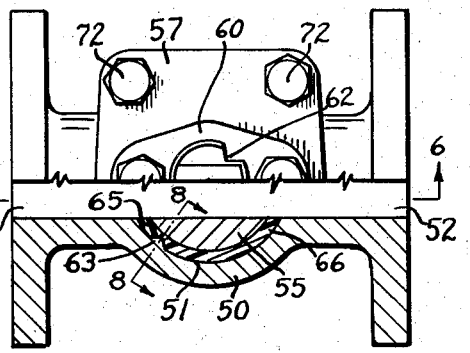
Fig. 7 is a view of the valve of Fig. 6 partly in plan and partly in section on the line 7—7 of Fig. 6.

Figs. 6 and 7 illustrate the application of the invention to a valve of the type wherein the body is closed at one end. Thus as shown in Fig. 6, the body 50 has a tapered bore 51 provided with opposed ports 52 and closed by an integral portion 53 of the body, and the tapered plug 55 has its stem 56 projecting from its larger end outwardly of the body. A cap 57 is bolted on the open end of the body in sealing relation with a diaphragm 58 and gasket 59, and the gland follower 60 is bolted on the cap 57 and is shown as of the same construction as the gland follower 20 for cooperation with the gasket or gland 61 both to seal around the plug stem 56 and also to apply pressure on the plug in the direction of the smaller end thereof. Additionally the gland follower 60 includes a lug or shoulder 62 corresponding in function to the shoulder 37 on the part 20.

The bore 51 is provided with a pair of opposed ribs 63 arranged similarly to the ribs 33 and acting to index the two liner sections 65 and 66 with relation to the ports 52. However, the bore 51 is not provided with shoulders of the type shown as 34 and 35, since with this bore tapered and left rough after casting as described, the liner sections tend initially to fit into the proper positions axially of the bore and thereafter are retained in position by their frictional engagement with the roughened bore surfaces. The ends of the ribs 63 are slightly tapered as shown at 64 in Fig. 8 to merge with the adjacent portions of the body.

The valve of Figs. 6 and 7 is assembled in substantially the same manner as already described for the valve of Figs. 1 and 3. The liner sections 65 and 66 are inserted first, followed by the plug and other parts, and it will be noted that the upper edge of the liner sections is provided with a shallow bevel 67 to facilitate initial insertion of the plug. This valve offers the same features and advantages already described for the valve of Figs. 1-3, including particularly the freedom provided for the liner sections to flow or extrude in all directions along the surface of the plug. This action is also facilitated by the undercut provided at 68 in the bottom of the bore 51, which makes it possible for the liner material to expand under the inward pressure of the plug as well as to flow axially toward the smaller end of the plug.

The valve of Figs. 6 and 7 offers a further practical advantage in production in that the counterbore 70 for receiving the cap or bonnet 58 does not require machining to concentric relation with the bore 51, as is commonly the case with conventional valves to establish centering of the plug stem in the bore. In the valve of the invention, the inner portion 71 of the bonnet 57 may have substantial clearance in the counterbore 70, and also the mounting bolts 72 may have substantial clearance in their receiving holes in the bonnet, in the manner shown for the bolts 25 and cap 22 in Fig. 1. Then when the valve is assembled, the plug may find its own best position in the lined bore before the bolts 72 are tightened, thus further assuring optimum performance as well as effecting additional saving in the production cost of the valve.

Figure 8:
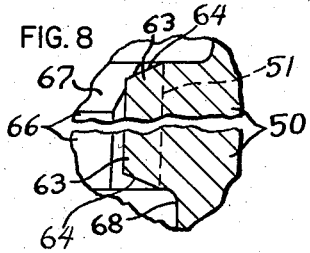
Fig. 8 is an enlarged fragmentary section on the line 8—8 of Fig. 7.
Figure 9:
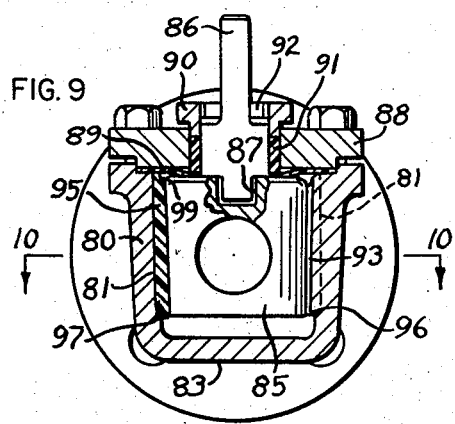
Fig. 9 is another view similar to Fig. 1 showing still another valve constructed in accordance with the invention and taken on the line 9—9 of Fig. 10.
Figure 10:
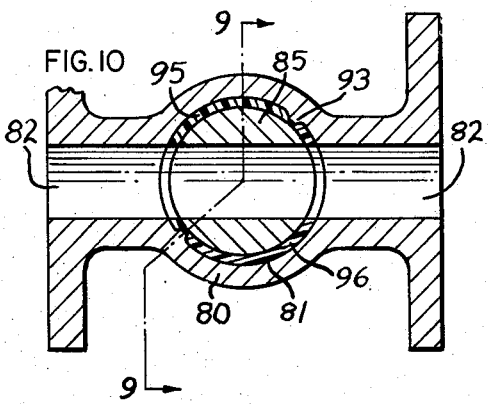
Fig. 10 is a section on the line 10—10 of Fig. 9.

In the valve of Figs. 6 and 7, the bore 51 and plug 55 are tapered at the same small angle, shown as approximately 2°. The valve shown in Fig. 8 is of similar construction including a body 80 having a transverse bore 81 provided with ports 82 and a closed bottom 83, but the bore 81 is cylindrical as compared with the tapered bore 51 in the body 50. The plug 85, however, is tapered similarly to the plug 55, and also it is shown as provided with a separate stem 86 having a keyed connection therewith at 87. The cap 88 seals the body 80 in cooperation with the diaphragm 89, and the gland follower 90 and gasket 91 are shown as identical with the parts 60 and 61 respectively, with the gland follower including a shoulder 92 corresponding to the shoulder 62.

The bore 81 in the body 80 is provided with ribs 93 similar to the ribs 63 for indexing the liner sections 95 and 96, and the latter are formed of sheet material similarly to the other liner sections described but are preferably of slightly wedged shape in section as shown in Fig. 8 to fit both the tapered surface of the plug 85 and the cylindrical surface of the bore 81. An additional indexing and retaining action on the inner edge of these liner sections is provided by a shallow shoulder 97 near the lower end of the bore 81, and also the upper edges of the liner sections are beveled at 99 to facilitate initial insertion of the plug. The assembly and operating characteristics of this valve are essentially the same as described in connection with Figs. 6 and 7, and it provides similar features and advantages.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A lined plug valve comprising a valve body having a bore therein provided with ports in the surface thereof, a rotatable plug in said bore having a flow passage therethrough for alignment with said ports, axially extending rib means projecting radially inwardly of the surrounding area of said bore adjacent one side only of each of said ports in substantially diametrically opposed relation, a pair of segmental liner sections received in said bore in the spaces between said rib means, each of said liner sections being of such circumferential dimensions as to extend from one of said rib means substantially to the other and having an initial thickness sufficiently greater than the radial dimensions of said rib means to project radially inwardly beyond said rib means for sealing engagement with said plug, each said liner section having a port therethrough adjacent one end thereof matching the adjacent said port in said bore with the remainder of the said section being imperforate and extending from said adjacent port to the more remote of said rib means, said liner sections being formed of a material which is deformable by said plug into maintained sealing engagement therewith, means cooperating with said rib means to retain the radially outer portions of said liner sections in substantially fixed position axially of said bore while providing for partial extrusion of the radially inner portions of said liner sections therebeyond in substantially all directions axially and circumferentially of said plug, and means for limiting rotation of said plug to a range wherein said flow passage therein does not cross either of said rib means but comes in contact only with said imperforate portions of said liner sections in all closed positions of said plug.

2. A lined plug valve comprising a valve body having a bore therein provided with ports in the surface thereof, a rotatable tapered plug in said bore having a flow passage therethrough for alignment with said ports, axially extending rib means projecting radially inwardly of the surrounding area of said bore adjacent one side only of each of said ports in substantially diametrically opposed relation, a pair of segmental liner sections received in said bore in the spaces between said rib means, each of said liner sections being of such circumferential dimensions as to extend from one of said rib means substantially to the other end having an initial thickness sufficiently greater than the radial dimensions of said rib means to project radially inwardly beyond said rib means for sealing engagement with said plug, each said liner section having a port therethrough adjacent one end thereof matching the adjacent said port in said bore with the remainder of the said section being imperforate and extending from said adjacent port to the more remote of said rib means, said liner sections being formed of a polytetrafluoroethylene material which is deformable by said plug into maintained sealing engagement therewith in response to movement of said plug toward the smaller end thereof, means for maintaining said plug under pressure in the direction of the smaller end thereof to cause said deformed sealing engagement of said liner sections with said plug, means cooperating with said rib means to retain the radially outer portions of said liner sections in substantially fixed position axially of said bore while providing for partial extrusion of the radially inner portions of said liner sections therebeyond in substantially all directions axially and circumferentially of said plug, and means for limiting rotation of said plug to a range wherein said flow passage therein does not cross either of said rib means but comes in contact only with said imperforate portions of said liner sections in all closed positions of said plug.

3. A lined plug valve comprising a valve body having a bore therein provided with ports in the surface thereof, a rotatable tapered plug in said bore having a flow passage therethrough for alignment with said ports, axially extending rib means projecting radially inwardly of the surrounding area of said bore adjacent one side only of each of said ports in substantially diametrically opposed relation, a pair of segmental liner sections received in said bore in the spaces between said rib means, each of said liner sections being of such circumferential dimensions as to extend from one of said rib means substantially to the other and having an initial thickness sufficiently greater than the radial dimensions of said rib means to project radially inwardly beyond said rib means for sealing engagement with said plug, each said liner section having a port therethrough adjacent one end thereof matching the adjacent said port in said bore with the remainder of the said section being imperforate and extending from said adjacent port to the more remote of said rib means, means for maintaining said plug under pressure in the direction of the smaller end thereof, said liner sections being of substantially shorter axial dimensions than said plug and bore to provide for said extrusion thereof along the sides of said plug in both directions as well as circumferentially of said plug, said liner sections being formed of a material which is deformable by said plug into maintained sealing engagement therewith under said pressure on said plug, means cooperating with said rib means to retain the radially outer portions of said liner sections in substantially fixed position axially of said bore while providing for partial extrusion of the radially inner portions of said liner sections therebeyond, and means for limiting rotation of said plug to a range wherein said flow passage therein does not cross either of said rib means but comes in contact only with said imperforate portions of said liner sections in all closed positions of said plug.

References Cited in the file of this patent

UNITED STATES PATENTS

| | | |
|---|---|---|
| 413,216 | Weber | Oct. 22, 1889 |
| 1,157,956 | Osborne | Oct. 26, 1915 |
| 2,713,987 | Schenck | July 26, 1955 |
| 2,735,645 | Freed | Feb. 21, 1956 |
| 2,813,695 | Stogner | Nov. 19, 1957 |

FOREIGN PATENTS

| | | |
|---|---|---|
| 8,858 | Great Britain | July 22, 1885 |
| 724,177 | France | Jan. 25, 1932 |